United States Patent [19]

Wielgosz et al.

[11] Patent Number: 5,246,999
[45] Date of Patent: Sep. 21, 1993

[54] THERMOPLASTIC POLYMER COMPOSITION

[75] Inventors: Zbigniew Wielgosz, Warsaw, Poland; Valentina Amerik; Dmitrij Bojko, both of Moskwa, U.S.S.R.; Regina Jeziorska, Warsaw, Poland; Ewa Kowalska, Warsaw, Poland; Piotr Penczek, Warsaw, Poland; Ewgenij Riabow; Galina Szkarpejkina, both of Moskwa, U.S.S.R.; Ewa Kicko-Walczak, Warsaw, Poland

[73] Assignees: Instytut Chemii Przemyskowej, Warsaw, Poland; Nauchno Issledovatelsjkij Institut Plasticheskich Mass Imeni G. S. Petrova, Moscow, U.S.S.R.

[21] Appl. No.: 699,177

[22] Filed: May 13, 1991

[51] Int. Cl.$^5$ .............. C08K 5/11; C08K 69/00; C08K 77/00; C08K 59/00

[52] U.S. Cl. .................. 524/290; 524/114; 524/306; 524/308; 524/310; 524/311

[58] Field of Search ............. 524/114, 306, 308, 310, 524/311, 290

[56] References Cited

U.S. PATENT DOCUMENTS

| | | | |
|---|---|---|---|
| 3,186,961 | 6/1965 | Sears | 524/114 |
| 3,479,308 | 11/1969 | Gattenby et al. | 524/114 |
| 3,959,560 | 5/1976 | Sturwold et al. | 524/310 |
| 4,444,934 | 4/1984 | Kasahara et al. | 524/310 |
| 4,900,769 | 2/1990 | Kimura et al. | 524/306 |

Primary Examiner—Paul R. Michl
Assistant Examiner—Andrew E. C. Merriam
Attorney, Agent, or Firm—Bauer & Schaffer

[57] ABSTRACT

There is disclosed thermoplastic polymeric compositions of polycarbonates, polyamides, polyacetals, and poly(2,6-dimethyl-1,4-phenylene oxides) and which contain in a minor amount sufficient to make the thermoplastic polymeric material easily releasable from a processing mold of fatty acid ester.

3 Claims, No Drawings

THERMOPLASTIC POLYMER COMPOSITION

FIELD OF THE INVENTION

This invention relates to a thermoplastic polymer composition which is easily releasable from processing molds especially during injection molding. The composition comprises thermoplastic high molecular weight polymer material and fatty acid esters as mold release agents.

BACKGROUND OF THE INVENTION

Thermoplastic polymer compositions containing polycarbonate as a main component are known. In this connection, there are also known additives which decrease adhesion of thermoplastic polymers to metals. For such purposes, additives such as products of complete or partial esterification of monocarboxylic or dicarboxylic aliphatic acids having long carbon chain with monohydric or polyhydric alcohols or phenols are employed.

According to European Patent No. 122,759 polyesters having g a degree of polymerization from 3 to 12 are used as additives that decrease adhesion of polycarbonates to processing mold. Those polyesters are obtained from aliphatic dicarboxylic acids containing from 2 to 6 carbon atoms and pentaerythritol, partially esterified by aliphatic monocarboxylic acids containing 2 to 6 carbon atoms.

According to Japanese Patent Application No. 86/261349, esters of aliphatic monocarboxylic acids containing from 12 to 30 carbon atoms reacted with C≦0 aliphatic alcohols or polyols are used as additives to decrease the adhesion of the polymer compositions to the processing mold.

Additives of this type are introduced by physical modification, applying 0.01 to 2.0 parts by weight of the additive per 100 parts by weight of high molecular weight of thermoplastic polymer, especially polycarbonate, which are mixed with dissolved, molten, or powdered polymer.

Processing molds, especially injections molds, are sometimes blocked during the processing of known thermoplastic polymer compositions. This makes the operation troublesome.

It is an aim of this invention to provide thermoplastic polymer compositions which exhibit decreased adhesion to metals and thus easily released from processing molds, thus avoiding blocking of the processing apparatus or devices.

BRIEF STATEMENT OF THE INVENTION

It has now been found that thermoplastic polymer compositions, containing high molecular weight thermoplastic polymer and fatty acid esters which up to now have not been used for this purpose, and optionally stabilizers, flame retardants, fillers, and dyes, achieve this aim.

These compositions are characterized by the fact that they comprise per 100 parts by weight of high molecular weight thermoplastic polymer, especially such as polycarbonate, polyamide, and polyacetal or blends thereof with other polymers, and 0.05-5.0 parts by weight of fatty acid esters of general formulae:

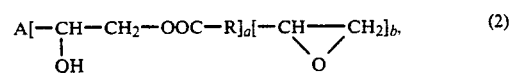

or

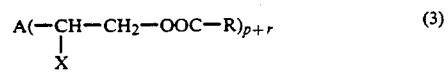

In general formula 1, R is selected from alkyl, alkenyl or alkadienyl groups containing 15–23 carbon atoms; A is a radical of general formula 4:

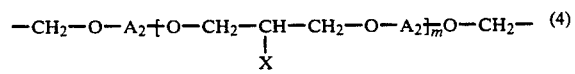

wherein $A_2$ is

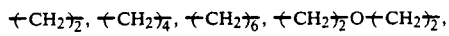

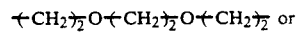

radical selected from:

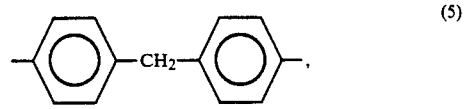

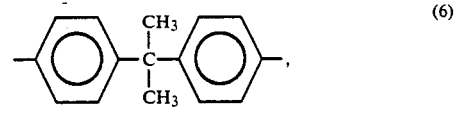

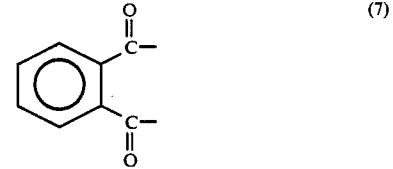

or

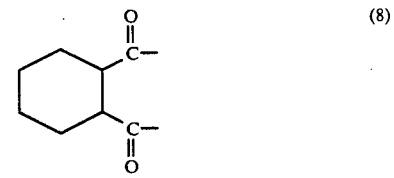

and m has a value in the range of from about 0.05 to 4.0. In general formula 1, has a value in the range of from about 1 to about 4, X and Y are either the same or different and denote —OH; a radical of the general formula RCOO—, wherein R is as above defined; or a radical of general formula —OOC—E—COOH, wherein E is a radical selected from $(CH_2)_2$, —CH=CH— or a radical of formula

-continued

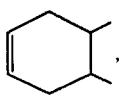  (10)

or

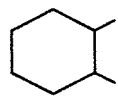  (11)

In general formula 1, X is a radical having general formula

—O—C—NH—Z—NH—C—O—  (12)
‖                       ‖
O                       O wherein Z is $(CH_2)_6$ or a radical of formula

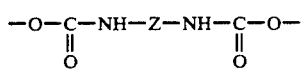  (5)

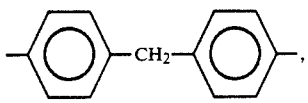  (13)

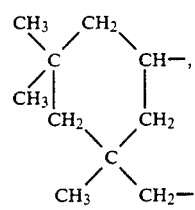  (14)

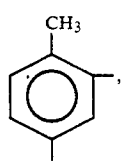

or

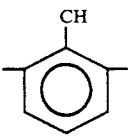  (15)

or X is a radical of general formula

—O—C—E—COO—CH$_2$—CH—A—CH—CH$_2$—OOC—E—C—O—  (16)
‖                    |       |                    ‖
O                    OH      OH                   O wherein E is as above defined and A is a group of general formula 4, wherein E is as above defined, and A is a group of general formula 4, wherein A and m are as above defined, and X is —OH. When X in general formula 1 is a group of general formula 12 or 16, then Y is —OH or a covalent bond. In general formula 2, R and A are as above defined, a has a value from about 1.4 to about 1.96 and b has a value from about 0.04 to about 0.6, and a+b equals 2.

In general formula 3, R is as above defined, X is —OH or a radical of general formula RCOO—, wherein R is as above defined, or a radical of general formula HOOC—E—COO—, wherein E is as above defined.

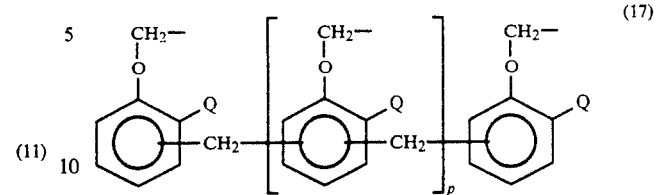  (17)

wherein Q is a hydrogen atom or CH$_3$, and p has a value from about 0.1 to about 4.0, or a radical of general formula

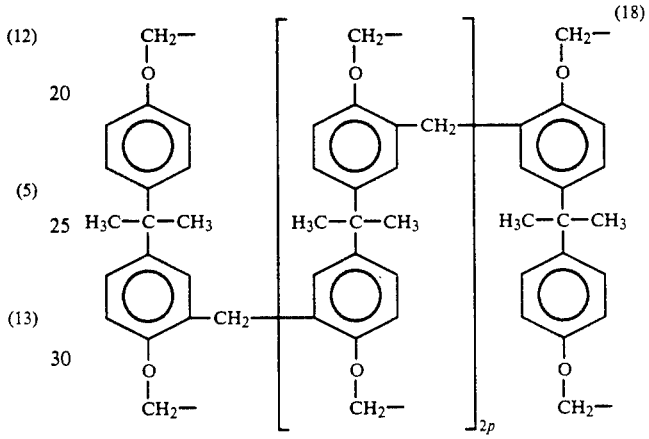  (18)

wherein p is as above defined.

In formula 3, r equals 2 if A is a radical of general formula 17, or r equals 4 if A is a radical of general formula 18.

DESCRIPTION OF THE PREFERRED EMBODIMENTS

Fatty acid esters coming within the above formulae and which may be employed in the compositions of this invention are prepared by known processes and preferably by the addition of saturated and unsaturated fatty acids such as, for example, palmitic acid, stearic acid, erucic acid, oleic acid and linolenic acid, or technical grade fatty acids mixtures to (a) low molecular weight or medium molecular weight epoxy resins based on epichlorohydrin and 2,2-bis(4-hydroxyphenyl) propane (Bisphenol A, BPA), bis(4-hydroxyphenyl)methane, ethylene glycol, diethylene glycol, triethylene glycol, 1,4-butanediol, 1,6-hexanediol, phthalic anhydride, hexahydrophthalic anhydride, and (b) epoxy novolac resins based on the condensation products used in thermoplastic compositions of the present invention, of phenol, o-cresol or Bisphenol A with formaldehyde. All of these products of addition of fatty acids to epoxy resins contain hydroxyl groups.

The above-described addition products are then converted into the esters by condensation of fatty acids with the hydroxyl groups of the addition products and such esters thus obtained are then used in thermoplastic polymer compositions of the present invention.

According to the present invention, addition products of fatty acids with epoxy resins and epoxy novolac resins, obtained by known processes at a ratio of fatty acids to epoxy groups which is lower than stoichiometric amounts are also used in molding compositions. These products have ester groups, hydroxyl groups, and unreacted epoxy groups.

Furthermore, the compositions described in this invention contain derivatives of addition products of fatty acids with epoxy resins and epoxy novolacs, obtained by known processes. In order to obtain such derivatives, reactions with the hydroxyl groups are accomplished in accordance with know processes.

Particularly suitable are addition products of cyclic anhydrides of dicarboxylic acids, preferably succinic anhydride, maleic anhydride, phthalic anhydride, tetrahydrophthalic anhydride and hexahydrophthalic anhydride with hydroxyl groups present in addition products of the fatty acids with epoxy resins and epoxy novolacs.

Additionally, compositions in accordance with the present invention include reaction products of aliphatic, cycloaliphatic and aromatic diisocyanates, preferably hexamethylene diisocyanate, isophorone diisocyanate, 4,4-diphenylmethane diisocyanate, as well as 2,4- and 2,6-toluene diisocyanate, and mixtures of the last two diisocyanates, with hydroxyl groups of the addition products of the fatty acids with epoxy resins.

The last group of compounds according to the present invention comprises addition products of the above-mentioned epoxy resins to carboxyl groups resulting from the above-described addition of cyclic anhydrides of dicarboxylic acids to reaction products of fatty acids and epoxy resins.

Examples of fatty acid esters used in compositions according to the invention are listed in Table 1.

TABLE 1

| | | EXAMPLES OF FATTY ACIDS ESTERS | | |
|---|---|---|---|---|
| | General | Fatty Acid Ester | | |
| Example 1 | Formula 2 | R 3 | A 4 | X 5 |
| I | 1 | $C_{17}H_{35}$ | Formula 4; $A_2$ = Formula 6; $X$ = OH; $m$ = 0.15 | OH |
| II | 1 | $C_{15}H_{33}$ (50%) $C_{17}H_{35}$ (50%) | Formula 4; $A_2$ = Formula 5; $X$ = OH; $m$ = 4.0 | OH |
| III | 1 | $C_{17}H_{33}$ | Formula 4; $A_2$ = Formula 7; $X$ = OH; $m$ = 2.0 | OH |
| IV | 1 | $C_{17}H_{31}$ | Formula 4; $A_2$ = Formula 8; $X$ = OOC—E—COOH; $m$ = 0.08; $E$ = $(-CH_2-)_2$ | —OOC—E—COOH; $E$ = $(-CH_2-)_2$ |
| V | 1 | $C_{17}H_{35}$ | Formula 4; $A_2$ = $(-CH_2)_2$; $X$ = —OOC—E—COOH; $m$ = 0.15; $E$ = —CH=CH— | —OOC—E—COOH; $E$ = —CH=CH— |
| VI | 1 | $C_{17}H_{36}$ | Formula 4; $A_2$ = $(-CH_2)_4$; $X$ = —OOC—E—COOH; $m$ = 0.15; $E$ = Formula 9 | —OOC—E—COOH; $E$ = Formula 9 |
| VII | 1 | $C_{15}H_{33}$ | Formula 4; $A_2$ = $(-CH_2-)_5$; $X$ = —OOC—E—COOH; $m$ = 0.15; $E$ = Formula 10 | —OOC—E—COOH; $E$ = Formula 10 |
| VIII | 1 | $C_{17}H_{35}$ | Formula 4; $A_2$ = $(-CH_2-)_2-O-(-CH_2-)_2$; $E$ = Formula 11; $m$ = 0.15; $X$ = —OOC—E—COOH | —OOC—E—COOH; $E$ = Formula 11 |
| IX | 1 | $C_{17}H_{35}$ | Formula 4; $A_2$ = $(CH_2)-O-(CH_2-)-O-(CH_2)$; $X$ = OH; $m$ = 0.15 | Formula 12; $Z$ = $(-CH_2-)_6$ |
| X | 1 | $C_{17}H_{35}$ | Formula 4; $A_2$ = Formula 6; $X$ = OH; $m$ = 0.15 | Formula 12; $Z$ = Formula 13 |
| XI | 1 | $C_{17}H_{35}$ | Formula 4; $A_2$ = Formula 6; $X$ = OH; $m$ = 0.15 | Formula 12; $Z$ = Formula 5 |
| XII | 1 | $C_{17}H_{35}$ | Formula 4; $A_2$ = Formula 6; $X$ = OH; $m$ = 0.15 | Formula 12; $Z$ = Formula 14 (65%) and Formula 15 (35%) |
| XIII | 1 | $C_{17}H_{35}$ | Formula 4; $A_2$ = Formula 6; $X$ = OH; $m$ = 0.15 | Formula 16; $A_2$ = Formula 6; $m$ = 0.15; $X$ = OH; $E$ = Formula 9 |
| XIV | 1 | $C_{17}H_{35}$ | Formula 4; $A_2$ = Formula 6; $X$ = OH; $m$ = 0.15 | Formula 16; $A_2$ = Formula 5; $m$ = 0.08; $X$ = OH; $E$ = $(-CH_2-)_2$ |
| XV | 1 | $C_{17}H_{35}$ | Formula 4; $A_2$ = Formula 6; $X$ = OH; $m$ = 0.15 | Formula 16; $A_2$ = Formula 8; $m$ = 4.0; $X$ = OH; $E$ = —CH=CH— |
| XVI | 1 | $C_{17}H_{35}$ | Formula 4; $A_2$ = Formula 6; $X$ = OH; $m$ = 0.15 | Formula 16; $A_2$ = Formula 7; $X$ = OH; $E$ = Formula 10; $m$ = 0.15 |
| XVII | 1 | $C_{17}H_{35}$ | Formula 4; $A_2$ = Formula 6; $X$ = OH; $m$ = 0.15 | Formula 16; $A_2$ = $(-CH_2-)_2$; $X$ = OH; $E$ = Formula 11; $m$ = 0.25 |

TABLE 1-continued

EXAMPLES OF FATTY ACIDS ESTERS

| | | | | |
|---|---|---|---|---|
| XVIII | 1 | $C_{17}H_{35}$ | Formula 4; $A_2$ = Formula 6 $X$ = OH; m = 0.15 | Formula 16; $A_2$ = $(-CH_2-)_2$ $X$ = OH; E = Formula 9 m = 0.42 |
| XIX | 1 | $C_{17}H_{35}$ | Formula 4; $A_2$ = Formula 6 $X$ = OH; m = 0.15 | Formula 16; $A_2$ = $(-CH_2-)_2$ $X$ = OH; E = Formula 9 m = 0.16 |
| XX | 1 | $C_{17}H_{35}$ | Formula 4; $A_2$ = Formula 6 $X$ = OH; m = 0.15 | Formula 16; $A_2$ = $(-CH_2-)_2$ $X$ = OH; E = Formula 9 m = 0.43 |
| XXI | 1 | $C_{17}H_{35}$ | Formula 4; $A_2$ = Formula 6 $X$ = OH; m = 0.15 | Formula 16; $X$ = OH; E = Formula 9; m = 0.71 $A_2 = (-CH_2-)_2-O-(-CH_2)_2-O-(-CH_2)_2$ |
| XXII | 1 | $C_{17}H_{35}$ | Formula 4; $A_2$ = Formula 6 $X$ = OH; m = 0.15 | $C_{17}H_{35}COO-$ |
| XXIII | 1 | $C_{17}H_{35}$ | Formula 4; $A_2$ = Formula 6 $X$ = OH; m = 0.15 | — |
| XXIV | 1 | $C_{15}H_{33}$ | Formula 4; $A_2$ = Formula 6 $X$ = OH; m = 0.15 | — |
| XXV | 1 | $C_{15}H_{33}$ | Formula 4; $A_2$ = Formula 6 $X$ = OH; m = 0.15 | — |
| XXVI | 1 | $C_{17}H_{35}$ | — | $C_{17}H_{35}COO-$ |
| XXVII | 1 | $C_{17}H_{35}$ | — | OH |
| XXVIII | 3 | $C_{17}H_{35}$ | — | $-OOC-E-COOH$; E = $-CH=CH$ |
| XXIX | 3 | $C_{17}H_{35}$ | — | OH |

| | Fatty Acid Ester | | | | | | |
|---|---|---|---|---|---|---|---|
| Example 1 | Y 6 | n 7 | a 8 | b 9 | A 10 | -p 11 | r 12 |
| I | OH | 1 | — | — | — | — | — |
| II | OH | 1 | — | — | — | — | — |
| III | OH | 1 | — | — | — | — | — |
| IV | $-OOC-E-COOH$ E = $(-CH_2-)_2$ | 1 | — | — | — | — | — |
| V | $-OOC-E-COOH$ E = $-CH=CH-$ | 1 | — | — | — | — | — |
| VI | $-OOC-E-COOH$ E = Formula 9 | 1 | — | — | — | — | — |
| VII | OH | 1 | — | — | — | — | — |
| VIII | OH | 1 | — | — | — | — | — |
| IX | OH | 2 | — | — | — | — | — |
| X | covalent bond (50%); OH (50%) | 3 | — | — | — | — | — |
| XI | covalent bond (60%); OH (40%) | 4 | — | — | — | — | — |
| XII | OH | 2 | — | — | — | — | — |
| XIII | OH | 2 | — | — | — | — | — |
| XIV | OH | 2 | — | — | — | — | — |
| XV | OH | 2 | — | — | — | — | — |
| XVI | OH | 2 | — | — | — | — | — |
| XVII | covalent bond (60%); OH (40%) | 4 | — | — | — | — | — |
| XVIII | covalent bond (50%); OH (50%) | 3 | — | — | — | — | — |
| XIX | OH | 2 | — | — | — | — | — |
| XX | OH | 2 | — | — | — | — | — |
| XXI | OH | 2 | — | — | — | — | — |
| XXII | $C_{17}H_{35}COO-$ | — | — | — | — | — | — |
| XXIII | — | — | 0.2 | 1.8 | — | — | — |
| XXIV | — | — | 1.96 | 0.4 | — | — | — |
| XXV | — | — | 1.4 | 0.6 | — | — | — |
| XXVI | OH | — | — | — | Formula 17 Q = H | 4.0 | 2 |
| XXVII | OH | — | — | — | Formula 17 | 3.2 | 2 |

TABLE 1-continued
EXAMPLES OF FATTY ACIDS ESTERS

| | | | | | | |
|---|---|---|---|---|---|---|
| | XXVIII | — | — | — | — | Q = CH$_3$ Formula 17; 3.2 | 2 |
| | XXIX | — | — | — | — | O = CH$_3$ Formula 18; 0.1 | 4 |

Examples of thermoplastic polymer compositions in accordance with the invention are given in Table 2.

TABLE 2
EXAMPLES OF POLYMER COMPOSITIONS

| | Number of Components, Weight Parts | | | | Composition properties | | |
|---|---|---|---|---|---|---|---|
| Example 1 | Thermoplastic Polymer 2 | Fatty Acid Ester Example Number (cf. Table 1) 3 | Other Additives 4 | Composition preparation 5 | Butt joint strength (conical test bars) mPa 6 | Butt joint strength GOST mPa 7 | Mouldings Released from Injection Mould without Damage % 8 |
| XXX | Bisphenol A polycarbonate (BPA polycarbonate) 99.5 | I; 0.5 | Ultranox 626/1 0.1 | Introduction of ester (during production of polycarbonate as dissolved in CH$_2$CL$_2$). Evaporation of the solvent | 28 | 62 | 99 |
| XXXI | BPA polycarbonate 99.7 | II; 0.3 | Ultranox 626; 0.2 TiO$_2$ (rutile) | Mixing of powdered polycarbonate with powdered ester | 29 | 66 | 99 |
| XXXII | BPA polycarbonate 99.8 | III; 0.2 | Ultranox 626 0.1 | Mixing of powdered polycarbonate with powdered ester | 31 | 67 | 100 |
| XXXIII | BPA polycarbonate 79.0 Copolymer (Acrylnitrile-Butadiene-Styrene) 20.0 | IV; 1.0 | Ultranox 626 0.1 | Mixing of powdered thermoplastics with powdered ester | 24 | 58 | 98 |
| XXXIV | BPA polycarobnate 99.95 | V; 0.5 | Ultranox 626 0.3 Glass fibre 20.0 | Dissolution of ester in acetone; Mixing with powdered polycarbonate; Drying | 29 | 60 | 99 |
| XXXV | BPA polycarbonate 99.6 | VI; 0.4 | Ultranox 626 0.1 Tinuvin 326 2 0.2 | Mixing of powdered polycarbonate with powdered ester | 26 | 60 | 100 |
| XXXVI | BPA polycarbonate 99.4 | VII; 0.6 | Ultranox 626 0.1 | Dissolution of ester in xylene; Mixing with powdered polycarbonate; Drying | 27 | 61 | 100 |
| XXXVII | BPA polycarbonate 99.9 | VIII; 0.1 | Ultranox 626 0.2 Carbon black 0.2 | Mixing of molten ester with molten polycarbonate during granulation process | 28 | 62 | 100 |
| XXXVIII | BPA polycarbonate 98.9 | IX; 1.1 | Ultranox 626 0.2 Glass fibre 40.0 | Introduction of ester (during production of polycarobnate as dissovled in CH$_2$Cl$_2$). Evaporation of solvent | 29 | 56 | 100 |
| XXXIX | BPA polycarbonate 95.0 | X; 5.0 | Ultranox 626 0.3 | Mixing of granular polycarbonate with granular 20% ester masterbatch in polyester | 28 | 62 | 99 |
| XL | BPA polycarbonate 98.2 | XI; 1.8 | Ultranox 626 0.1 Tinuvin P 0.2 0.3 | Mixing of powdered polycarbonate with powdered ester | 27 | 58 | 100 |
| XLI | BPA polycarbonate 98.4 | XII; 1.6 | Ultranox 626 0.2 | | 28 | 56 | 99 |
| XLII | BPA polycarbonate 79.3 Poly(ethylene terephthalate) 20.0 | XII; 0.7 | Ultranox 626 0.1 | Mixing of powdered thermoplastics with powdered ester | 23 | 52 | 99 |
| XLIII | BPA polycarbonate 98.5 | XIV; 1.5 | Ultranox 626 0.2 Glass fibre 20.0 Carbon black 0.3 | Dissolution of ester in acetone, Mixing with powdered polycarbonate; Drying | 29 | 60 | 100 |
| XLIV | BPA polycarbonate 99.2 | XV; 0.8 | Ultranox 626 0.3 | Dissolution of ester in acetone, Mixing with powdered polycarbonate; Drying | 28 | 62 | 100 |
| XLV | BPA polycarbonate 79.7 Poly(butylene terephthalate) 20.0 | XXI; 0.3 | Ultranox 626 0.3 | Dissolution of ester in acetone, Mixing with powdered thermoplastics; Drying | 24 | 55 | 98 |
| XLVI | BPA polycarbonate 99.9 | XXII; 0.1 | Ultranox 626 0.3 Glas fibre 30.0 TiO$_2$ 0.3 | Mixing of granular polycarbonate with granular 10% ester masterbatch in polyester | 28 | 62 | 100 |

TABLE 2-continued
EXAMPLES OF POLYMER COMPOSITIONS

| Example 1 | Thermoplastic Polymer 2 | Fatty Acid Ester Example Number (cf. Table 1) 3 | Other Additives 4 | Composition preparation 5 | Butt joint strength (conical test bars) mPa 6 | Butt joint strength GOST mPa 7 | Mouldings Released from Injection Mould without Damage % 8 |
|---|---|---|---|---|---|---|---|
| XLVII | BPA polycarbonate 99.1 | XVIII; 0.9 | Ultranox 626 0.3 | Mixing of granular polycarbonate with granular 20% ester masterbatch in polycarbonate | 28 | 58 | 99 |
| XLVIII | BPA polycarbonate 98.3 | XIX; 1.7 | Ultranox 626 0.2 Tituvin 234 0.3 | Mixing of powdered polycarbonate with powdered ester | 27 | 52 | 99 |
| XLIX | BPA polycarbonate 99.7 | XX; 0.3 | Ultranox 626 0.1 | Dissolution of ester in acetone, Mixing with powdered polycarbonate; Drying | 29 | 59 | 100 |
| L | BPA polycarbonate 98.6 | XXI; 1.4 | Ultranox 626 0.3 Glass fibre 30.0 | Mixing of Molten ester with molten polycarbonate during granulation process. | 26 | 54 | 100 |
| LI | BPA polycarbonate 99.8 | XXII; 0.2 | Ultranox 626 0.2 | Mixing of powdered polycarbonate with powdered ester | 28 | 59 | 100 |
| LII | BPA polycarbonate 99.7 | XXIII; 0.3 | Ultranox 626 0.1 | Mixing of granular polycarbonate with granular 10% ester masterbatch in polycarbonate | 26 | 58 | 100 |
| LIII | Polyamide 6 99.5 | XXIX; 0.5 | Glass fibre 25.0 | Mixing of Molten ester with molten polyamide during granulation process | | | 74 |
| LIV | Polyamide 6 99.7 | XXV; 0.3 | — | Mixing of granular polyamide with granular 10% ester masterbatch in polyamide | | | 76 |
| LV | BPA polycarbonate 99.9 | XXVI; 0.1 | Ultranox 626 0.1 Tinuvin P 0.3 | Mixing of granular polycarbonate with granular ester masterbatch in polycarbonate | 25 | 60 | 99 |
| LVI | BPA polycarbonate 99.3 | XXVII; 0.2 | Ultranox 626 0.3 | Mixing of powdered polycarbonate with powdered ester | 28 | 53 | 100 |
| LVII | Polyoxymethylene | XXVIII; 0.5 | Irganox 259 0.6 Dicyandiamide 0.4 | Mixing of powdered polyoxymethylene with powdered ester | | | — |
| LVIII | BPA polycarbonate 99.9 | XXIX; 1.0 | Ultranox 626 0.3 | Dissolution of ester in acetone, mixing with powdered polycarbonate; Drying | | | 100 |
| LIX | BPA polycarbonate 100.0 | — | Ultranox 626 0.3 | — | 46 | 88 | 80 |
| LX | BPA polycarbonate 100.0 | — | Ultranox 626 0.3 | — | 48 | 89 | 76 |
| LXI | Poyamide 6 | — | Glass fibre 25.0 | — | | | 0 |
| LXII | Polyamide 6 | — | — | — | | | 0 |
| LXIII | Polyoxymethylene 100.0 | — | Irganox 259 0.6 Dicyandiamide 0.4 | — | | | |

1/ Manufacturer: Borg Warner
2/ Manufacturer: CIBA GEIGY
3/ Polycarbonate - injection moulding cf. FIG. 1
Polyamide - injection moulding cf. FIG. 2
Polyoxymethylene - injection moulding cf. FIG. 2

Thermoplastic polymer compositions according to the invention are prepared by adding from about 0.05 to 5.0 parts by weight to 100 parts by weight of dissolved, powdered, or granular high molecular weight thermoplastic polymer, preferably polycarbonate, polyamide, polyacetal, or poly(2,6-dimethyl-1,4-phenylene oxide) and mixing the constituents until a substantial homogeneous mixture is obtained. If desired, other components such as stabilizers, flame retardants, powdered and fibrous fillers, preferably staple glass fiber, and colorants and the like may be added to the mixture. The above-mentioned additives—that is, fatty acid esters of general formula 1, 2, or 3 are added as melts, powders, solutions, or as a master batch in the corresponding thermoplastic polymer.

Thermoplastic polymer compositions thus obtained are processed preferably by injection molding, extrusion molding, compression molding, and other processes used in processing of thermoplastics. In the course of tests, neither complete nor even partial sticking to processing molds or extruder dies nor blocking of the processing molds was observed.

Moreover, fatty acid esters of general formulae 1, 2, and 3 do not exert negative effects on the properties of moldings obtained from the thermoplastic polymer compositions in accordance with the present invention.

Various modifications of the present invention may be made without departing from the spirit and scope of the invention. It is to be understood, therefore, that the invention is not to be limited to the described embodiments, except as defined in the appended claims.

What is claimed is:

1. A thermoplastic polymeric composition comprising (a) a major amount of a high molecular weight polymeric material selected from the group consisting of thermoplastic polycarbonates, polyamides, polyacetals, and poly(2,6-dimethyl-1,4-phenylene oxide) poly(ethylene terephthalate) and blends thereof with each other and with other polymers; and (b) minor amount sufficient to make said high molecular weight polymeric material easily releasable from a processing mold of fatty acid ester selected from the group consisting of fatty acid esters having the general formula:

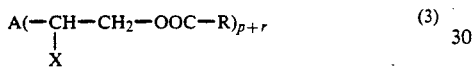

(3)

in which R is a hydrocarbon radical selected from the group consisting of alkyl, alkenyl, and alkadienyl radicals containing from 15 to 25 carbon atoms, A is a radial having the general formula:

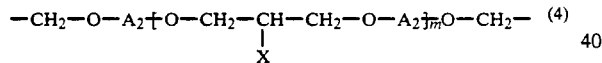

(4)

wherein $A_2$—, is a radical selected from the group consisting of a radical having the formulae:

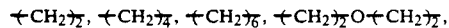

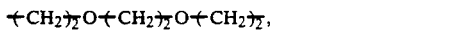

(5)

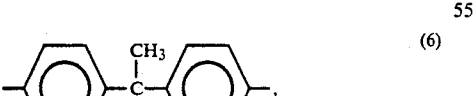

(6)

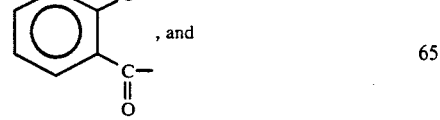

, and (7)

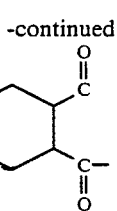

(8)

where m has a value of 0.05 to 4.0; X may be the same or different radicals selected from the group of radicals consisting of —OH, ROO—, and wherein R is as defined above or is OOC—E—COOH, wherein E is a radical selected from the group consisting of a radical having the formulae:

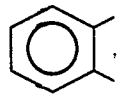

(9)

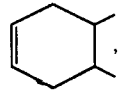

(10)

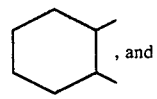

, and (11)

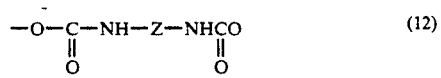

(12)

wherein Z is a radical selected from the group consisting of radicals having the formulae:

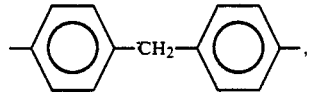

(5)

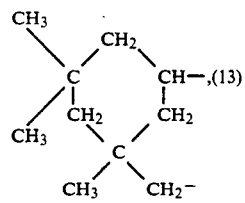

(13)

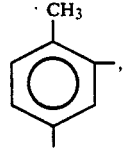

(14)

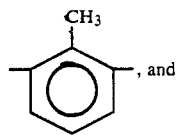

, and (15)

-continued

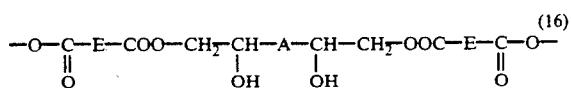 (16)

wherein E is as defined above and A is a radical selected from the group of radicals having the formula:

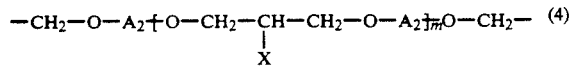 (4)

wherein $A_2$ is as described above and m has a value of 0.05 to 4.0; X is —OH provided that when the fatty acid ester has the formula (3), the radical (4) is selected from the group consisting of radicals having the formulae:

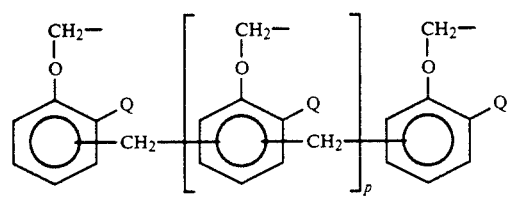 (17)

and

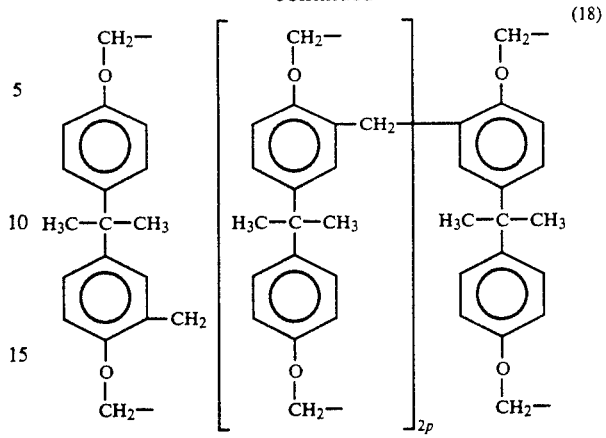 (18)

wherein R is as defined above or has the general formula HOOC—E—COO—, wherein E is as defined above, Q is selected from hydrogen and $CH_3$—, P has a value from 0.1 to 4.0, R equals 2 when A is a radical of formula (17) and r equals 4 when A is a radical of formula (18).

2. A thermoplastic polymeric composition according to claim 1, wherein the fatty acid ester is present in parts by weight, based on 100 parts by weight of high molecular weight polymeric material, in a range of from about 0.05 to about 5.0 parts.

3. A thermoplastic polymeric composition according to claim 1, including stabilizers, flame retardants, filters, and dyes.

* * * * *